Dec. 24, 1940.   J. ANTHONY   2,226,364
AUTOMATIC DATING DEVICE FOR CAMERAS
Filed July 28, 1939   2 Sheets-Sheet 1
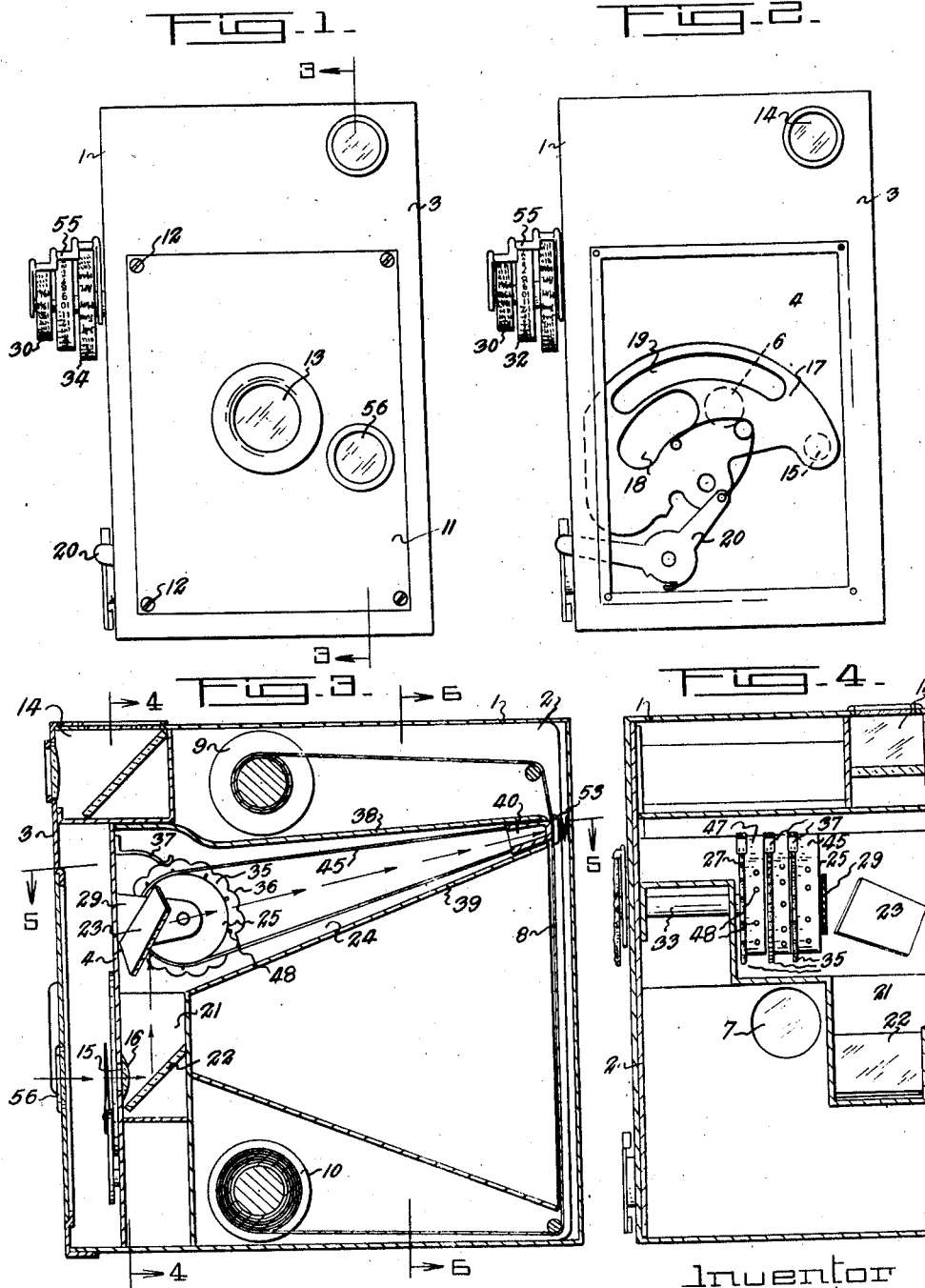

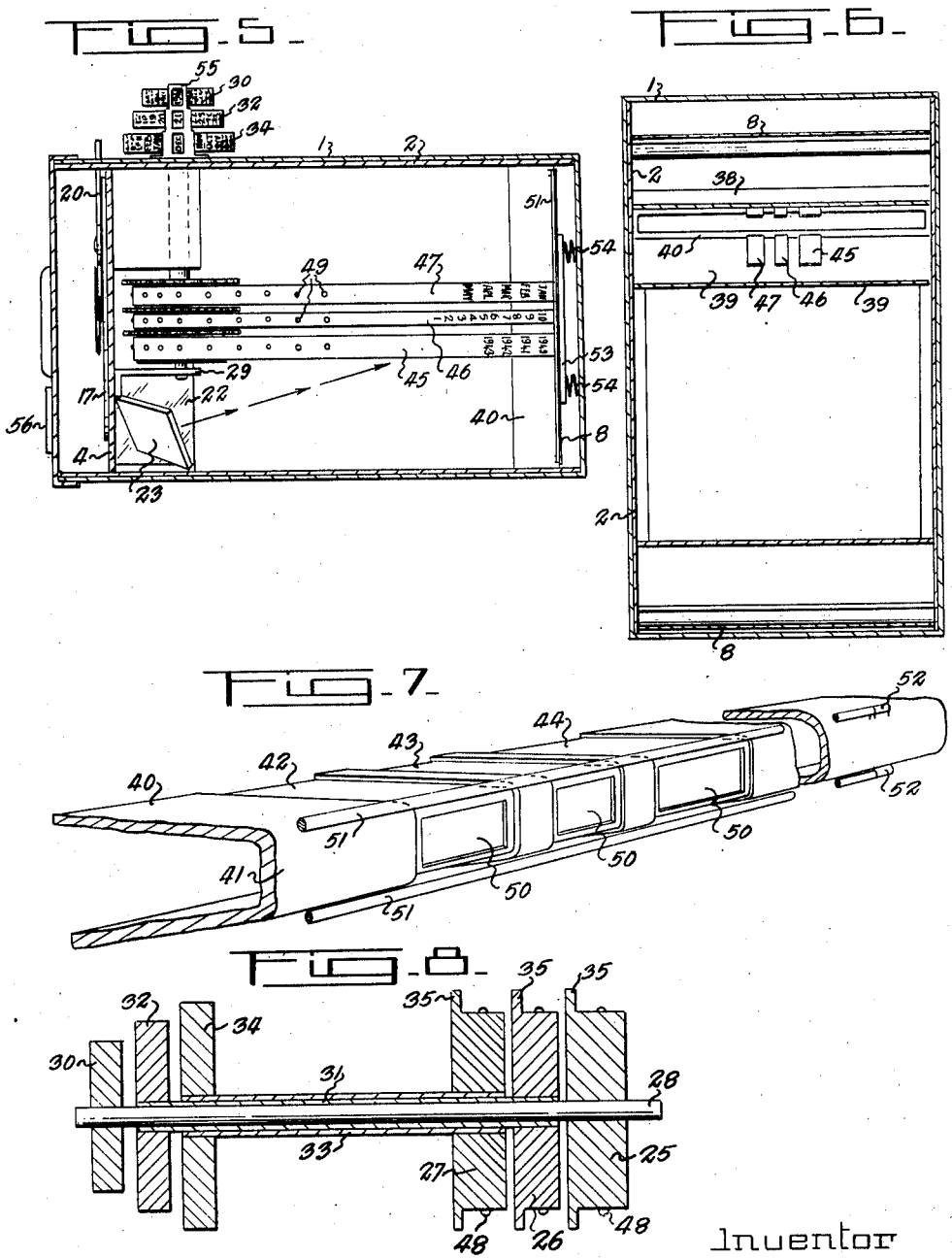

Patented Dec. 24, 1940

2,226,364

UNITED STATES PATENT OFFICE 2,226,364

AUTOMATIC DATING DEVICE FOR CAMERAS

Joseph Anthony, Hamilton, Ontario, Canada

Application July 28, 1939, Serial No. 287,051

13 Claims. (Cl. 95—1.1)

My invention relates to improvements in cameras and the object of my invention is to provide a simple device through which light is admitted to strike the marginal edge of the portion of the sensitized film being exposed when the shutter of the camera is actuated to make the usual photographic exposure. The beam of light which passes through my apparatus upon actuation of the camera shutter passes through one or more transparent ribbons which carry date numerals or any other desired characters whereby such characters are photographed on the film at the same time as the usual photographic exposure is made.

Another object of my invention is to carry the transparent numeral containing ribbons over a suitable carrier positioned adjacent the sensitized face of the film. The ribbons are each in the form of a loop, the ribbon loops being carried over ribbon actuating rollers, and the rollers carried upon suitable spindles having their outer ends projecting from the camera and carrying thumb and finger actuated knobs which are marked with numerals or other characters corresponding to the numerals and characters on the ribbons. The knobs and ribbons are so arranged in relation to each other that when certain characters on the knobs are opposite a stationary pointer adjacent the knobs, corresponding characters will be adjacent the sensitized face of the film, and when the film is exposed through actuation of the camera shutter, such characters will be photographed on the margin of the exposed area of the film.

A further object of my invention is to furnish the camera with a pair of lenses, one lens being the usual photographic lens and the other lens projecting a beam of light on a suitable arrangement of mirrors which carry such beam of light to the back of the camera where the light beam passes through the transparent ribbons to photograph the numerals or characters on the ribbon on to the camera film, the lens apertures being controlled by a unitary standard shutter mechanism of a simple type, such as is provided in standard camera constructions.

A still further and important object of my invention is to so construct my apparatus that it will not materially add to the cost of the camera manufacture or noticeably increase the camera in size, while at the same time being of a simple and sturdy construction.

With the foregoing and other objects in view as shall also appear, my invention consists of a camera constructed and arranged all as hereinafter more particularly described and illustrated in the accompanying drawings, in which:

Figure 1 is a front elevational view of a box camera incorporating my invention.

Figure 2 is a similar view to Figure 1 showing the camera with its front shutter covering plate removed.

Figure 3 is a vertical longitudinal sectional view through the camera, being taken through the line 3—3, Figure 1.

Figure 4 is a vertical transverse sectional view taken through the line 4—4, Figure 3.

Figure 5 is a plan sectional view taken through the line 5—5, Figure 3.

Figure 6 is a vertical transverse sectional view taken through the line 6—6, Figure 3.

Figure 7 is an enlarged perspective view of the carrier around which the transparent ribbons ride and which is positioned adjacent the sensitized face of the film; and, Figure 8 is an enlarged cross-sectional view through the knob and roller assembly showing the spindle and sleeve connections between respective knobs and rollers.

Like characters of reference indicate corresponding parts in the different views in the drawings.

Apart from my invention, the camera illustrated is of the usual box camera construction and consists of an outer rectangular light-proof box 1 into which is slid the film, film roller and shutter containing assembly 2, the front of such assembly carrying the front face 3 of the camera which forms a light-tight closure for the front end of the box 1. Spaced away from the front 3 of the camera is an inner front 4. The usual simple type of shutter assembly is mounted upon the forward face of the inner front 4, and the shutter works across the face of an aperture 6 in the inner front. The aperture 6 admits light through a lens 7 to the sensitized face of the film 8 carried upon the usual spools 9 and 10 and threaded across the back of the inner assembly of the camera. The front 3 of the camera is fitted with a plate 11 which is retained in place by screws 12 and provided with a glazed orifice 13 which registers with the aperture 6 and lens 7. A usual view finder construction 14 is fitted in the upper corner of the camera.

In incorporating my apparatus, I pierce the inner front 4 with a second aperture 15 which is glazed with a suitable lens 16, the aperture 15 being so positioned that it is covered or exposed by the movement of the shutter. Referring particularly to Figure 2, it will be seen that the shutter consists of a swingable substantially segmental shaped plate 17 formed with a pair of suitably curved slots 18 and 19. When the shutter is closed the apertures 6 and 15 are covered by the shutter plate 17, and when the plate is swung during the actuation of the shutter release lever 20, the curved slots 18 and 19 move across the apertures 6 and 15 and thus expose them to the penetration of light rays. The curved slot 19 is preferably of such a length that the aperture 15 is exposed for a slightly longer time than the exposure of the camera lens 7, so as to insure the admittance of a sufficient volume of light to clearly define the ribbon characters upon the sensitized film.

Rearwardly of the aperture 15 and behind the inner front 4, I provide a chamber 21 open at its top and containing an inclined mirror 22 which is so positioned behind the aperture 15 that the light rays passing through such aperture 15 are concentrated by the lens 16 to strike the mirror, and are reflected in an upward direction to strike against and be reflected from a second suitably inclined mirror 23 which is positioned some little distance above the open top of the chamber 21.

The mirror 23 is contained in the forward wide end of a light-tight substantially wedge-shaped chamber 24 which extends from the back face of the inner front 4 to the face of the vertical portion of the film 8. The forward wide end of the wedge-shaped chamber 24 also contains three concentrically positioned rollers 25, 26 and 27. The roller 25 is carried upon the spindle 28 having its inner end rotatably contained within a bracket 29 carried upon the inner face of the inner front 4 and its other end projecting through the side of the camera and carrying a thumb and finger knob 30. The roller 26 is carried upon the inner end of a sleeve 31 which surrounds the spindle 28. The outer end of the sleeve 31 projects from the camera and carries a second thumb and finger knob 32. The roller 27 is secured upon the inner end of a second sleeve 33 surrounding the sleeve 31 and the outer end of the sleeve 33 projects from the camera and carries a third thumb and finger knob 34. It will thus be seen that each of the rollers can be individually rotated by its knob. The rollers are each formed with enlarged side disc portions 35. The peripheries of such discs are formed with notches 36 which are engaged by three spring pawl members 37 to retain the rollers in their adjusted positions.

The adjacent rear end portions of the upper and lower walls 38 and 39 of the wedge shaped chamber 24 contain the carrier over which the numeral containing ribbons are passed, such carrier, as illustrated in Figure 7, being positioned with its rear face closely adjacent the face of the sensitized film, as illustrated in Figure 3. The carrier 40 is of substantially V-shaped cross-section and is positioned so that its divergent outer faces lie against the inner faces of the upper and lower walls 38 and 39 of the wedge shaped chamber 24 and its rear or apex face 41 is positioned closely adjacent the sensitized face of the film 8. The outer top end of the lower faces of the carrier 40 is formed with three grooves 42, 43 and 44 which are of substantially the same widths and spaced relationships as the respective rollers 25, 26 and 27. Three transparent ribbon loops 45, 46 and 47 extend around the rollers and the carrier. The ribbon loop 45 extends around the roller 25 and also around the carrier 40 in the groove 42. The ribbon loop 46 extends around the roller 26 and carrier 40 in the groove 43, and the ribbon loop 47 extends around the roller 27 and carrier 40 in the groove 44. In order that rotation of the rollers 25, 26 and 27 may positively move the respective ribbons carried thereon, I furnish the faces of the rollers with spaced apart studs 48 which project through correspondingly spaced apart orifices 49 in the ribbons. The rear apex face end 41 of the carrier 40 is pierced with three orifices 50 in the channeled portions thereof so that the portions of the transparent ribbons adjacent the sensitized face of the film 8 are opposite the orifices 50.

In order to prevent the sensitized face of the film 8 from the possibility of being marked as it moves over the rear face 41 of the ribbon carrier when the film is being moved in the usual manner after a picture has been taken, the carrier 40 may be furnished with a pair of freely rotatable roller rods 51 mounted in the vicinity of the upper and lower corners of the carrier and rotatably contacting the film 8. The ends of the roller rods 51 can be mounted in any kind of suitable bearing clips such as the bearing clips 52 which are secured upon or pressed out of the end portions of the carrier, as illustrated in Figure 7. To retain the film 8 in close contact with the transparent ribbons as it passes the carrier 40, I furnish a pressure plate 53 which presses against the usual paper backing of the film 8 at the point where the film is adjacent the carrier 40. The pressure plate 53 is carried upon a pair of compressible springs 54 mounted upon the inner rear face of the camera box 1.

In my device as illustrated, the three ribbons 45, 46 and 47 are provided for photographing on the film the date upon which the picture was taken, and therefore the ribbon 45 carries a series of year numerals, such as 1939, 1940, 1941, etc., the ribbon 46 carries a series of day of month numerals from 1 to 31, and the ribbon 47 carries the names of the twelve months of the year. The ribbons are preferably transparent and the characters thereon opaque. Of course, if it is so desired, the ribbons may be provided opaque and the characters thereon transparent.

The ribbon actuating thumb and finger knobs 34, 32 and 30 have the months, month date, and year dates respectively imprinted upon their peripheries, and a registering or pointer member 55 is mounted upon the side of the camera box to extend over the tops of the knobs. The ribbons are so positioned upon the rollers that when any particular date combination on the ribbons is opposite the windows 50 in the carrier 40, such date combination is also underneath the windows in the pointer member 55. It will thus be seen that by adjusting the knobs 30, 32 and 34 that any desired date combination can be photographed on the film. When an exposure is made, the aperture 15 is uncovered by the shutter plate 17 as previously explained, and a beam of light passes through the orifice 56 and lens 16 to strike the inclined mirror 22 and be reflected upwardly to strike the suitably inclined mirror 23 which in turn reflects the light rearwardly through the wedge shaped chamber 24 to pass through the windows 50 in the carrier member 40 at the rearward end of the chamber 24, and thus the numerals on the ribbons positioned over the windows 50 are photographed on the margin of the film portion being exposed at the same time as the photograph is taken.

While I have shown my invention as incorporated in a box camera, it will be appreciated that any person skilled in the art can readily apply my invention to other standard types of camera without departing from the spirit of my invention as set forth in the appended claims.

What I claim as my invention is:

1. The combination with a camera having a lens and shutter and adapted to contain a sensitized element positioned to receive an image through the lens when the shutter is opened, of a plurality of ribbon loops each having transparent and opaque portions which define characters positioned so that a portion of each loop extends of the sensitized element, a plurality of rollers each carrying one end of a ribbon loop, a carrier member formed with channels in its outer face and supporting the other ends of the ribbon loops, each loop being adapted to slide along a channel in the carrier member and also to pass over an orifice in the carrier member, and means for projecting a beam of light through the carrier member and through the ribbon onto the sensitized element when the element is exposed through actuation of the shutter.

2. The combination with a camera having a lens and shutter and adapted to contain a sensitized element positioned to receive an image through the lens when the shutter is opened, of a ribbon loop having transparent and opaque portions which define characters positioned so that a portion of the loop extends in front of the sensitized element, means for rotatably supporting the ribbon loop and adjustable from the outside of the camera, a lens glazing an aperture in the camera structure, said lens being covered and uncovered by the camera shutter, and a mirror so positioned rearwardly of the lens as to reflect light beams entering through the lens on to and through the portion of the ribbon loop adjacent the sensitized element.

3. The combination with a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers contained within the forward portion of the camera and each carrying a ribbon loop and rotatable from the outside of the camera, a carrier member extending transversely of the camera adjacent the face of the sensitized element and upon which the rearward ends of the ribbon loops are slidably supported, a lens glazing an orifice in the camera structure, said lens being covered and uncovered by the camera shutter, and a mirror so positioned rearwardly of the lens as to reflect light beams entering through the lens on to and through the portions of the ribbon loops extending over the carrier member adjacent the sensitized element.

4. The combination with a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers contained within the forward portion of the camera and each carrying a ribbon loop and rotatable from the outside of the camera, a carrier member extending transversely of the camera adjacent the face of the sensitized element and upon which the rearward ends of the ribbon loops are slidably supported, notched peripheral edge portions formed on the ribbon loop supporting rollers, spring pawl members engaging the notches to retain the rollers in their adjusted positions, a lens glazing an orifice in the camera structure, said lens being covered and uncovered by the camera shutter, and a mirror so positioned rearwardly of the lens as to reflect light beams entering through the lens on to and through the portions of the ribbon loops extending over the carrier member adjacent the sensitized element.

5. The combination with a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers contained within the forward portion of the camera and each carrying a ribbon loop and rotatable from the outside of the camera, a carrier member extending transversely of the camera and positioned adjacent the sensitized element, a plurality of rollers engaging the portion of the element behind the carrier member, each ribbon loop passing over the carrier member between the rollers and the carrier member and across an orifice in the carrier member, a lens glazing an orifice in the camera structure, said lens being covered and uncovered by the camera shutter, and a mirror so positioned rearwardly of the lens as to reflect light beams entering through the lens on to and through the portions of the ribbon loops extending over the carrier member adjacent the sensitized element.

6. The combination of a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers each carrying a ribbon loop and mounted side by side and having the same axis of rotation, said rollers being positioned in the forward end of the camera above the camera lens, manually rotatable knobs positioned on the outside of the camera, each knob being connected to and actuating a roller, a carrier member extending transversely of the camera adjacent the face of the sensitized element and upon which the rearward ends of the ribbon loops are slidably supported, a lens glazing an orifice in the camera structure, said lens being covered and uncovered by the camera shutter, and a mirror so positioned rearwardly of the lens as to reflect light beams entering through the lens on to and through the portions of the ribbon loops extending over the carrier member adjacent the sensitized element.

7. The combination of a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers each carrying a ribbon loop and mounted side by side and having the same axis of rotation, said rollers being positioned in the forward end of the camera above the camera lens, manually rotatable knobs positioned on the outside of the camera, each knob being connected to and actuating a roller, a carrier member extending transversely of the camera adjacent the face of the sensitized element and upon which the rearward ends of the ribbon loops are slidably supported, a lens glazing an orifice in the camera structure, the lens and orifice being positioned below the ribbon loop carrying rollers, an inclined mirror positioned rearwardly of the lens to reflect light beams entering through the lens in an upward direction, and a second mirror positioned above the first mirror and so inclined as to receive the light beams reflected from the first mirror and in turn reflect the light beams rearwardly and through the portions of the ribbon loops extending over the carrier member adjacent the sensitized element.

8. The combination of a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers each carrying a ribbon loop and mounted side by side and having the same axis of rotation, said rollers being positioned in the forward end of the camera above the camera lens, manually rotatable knobs positioned on the outside of the camera, each knob being connected to and actuating a roller, each of said knobs having characters imprinted upon its face which characters correspond to the characters defined upon the ribbon loop which extends over the roller actuated by that particular knob, a stationary pointer element positioned in proximity to the knobs, each knob being so adjusted in relation to the position of the ribbon loop on the roller actuated by the knob that when a certain character on the knob is adjacent the pointer, the corresponding character on the ribbon loop is positioned adjacent the sensitized element, a carrier member extending transversely of the camera adjacent the face of the sensitized element and upon which the rearward ends of the ribbon loops are slidably supported, a lens glazing an orifice in the camera structure, said lens being covered and uncovered by the camera shutter, and a mirror so positioned rearwardly of the lens as to reflect light beams entering through the lens on to and through the portions of the ribbon loops extending over the carrier member adjacent the sensitized element.

9. The combination with a camera having a lens and shutter and adapted to contain a sensitized element positioned to receive an image through the lens when the shutter is opened, of a plurality of ribbon loops having transparent and opaque portions which define characters positioned to extend from the forward end of the camera to the rear end of the camera in front of and adjacent the sensitized element, a plurality of rollers contained within the forward portion of the camera and each carrying a ribbon loop and rotatable from the outside of the camera, a plurality of spaced apart studs projecting outwardly from the peripheral face of each roller and adapted to project through a plurality of similarly spaced apart orifices in the ribbon extending over the roller, a carrier member extending transversely of the camera and positioned adjacent the sensitized element, a pressure plate resiliently mounted in the camera and bearing against the portion of the sensitized element adjacent the carrier member, and a lens glazing an orifice in the camera structure, said lens being covered and uncovered by the camera shutter and provided to project a beam of light on to the portions of the ribbon loops extending over the carrier member adjacent the sensitized element when the element is exposed through the actuation of the shutter.

10. The combination with a camera having a lens and shutter and adapted to contain a sensitized element positioned to receive an image through the lens when the shutter is opened, of a ribbon loop wholly contained within the camera, said loop having transparent and opaque portions which define characters and being so positioned that a portion of the loop extends in front of the sensitized element, means for rotatably supporting the ribbon loop and adjustable from the outside of the camera, and means for projecting a beam of light through the ribbon on to the sensitized element when the element is exposed through actuation of the shutter.

11. The combination with a camera having a lens and shutter and adapted to contain a sensitized element positioned to receive an image through the lens when the shutter is opened, of a plurality of ribbon loops wholly contained within the camera, said loops each having transparent and opaque portions which define characters and being so positioned that a portion of each loop extends in front of the negative, a plurality of rollers each carrying one end of a ribbon loop, a carrier member supporting the other ends of the ribbon loops and positioned adjacent the sensitized element, each ribbon loop passing over an orifice in the carrier member, and means for projecting a beam of light through the carrier member and through the ribbon loops on to the sensitized element when the element is exposed through actuation of the shutter.

12. The combination with a camera having a lens and shutter and adapted to contain a sensitized element positioned to receive an image through the lens when the shutter is opened, a ribbon loop wholly contained within a light-tight chamber in the camera, said loop having transparent and opaque portions which define characters and being so positioned that a portion of the loop extends in front of the sensitized element, and a mirror so positioned as to project a beam of light through the ribbon on to the sensitized element when the element is exposed through actuation of the shutter.

13. The combination with a camera having a lens and shutter and adapted to contain a sensitized element positioned to receive an image through the lens when the shutter is opened, of a ribbon loop having transparent and opaque portions which define characters positioned so that a portion of the loop extends in front of the sensitized element, means for rotatably supporting the ribbon loop and adjustable from the outside of the camera, the camera having another light admitting aperture in addition to the lens, the aperture being covered and uncovered by the camera shutter, and a mirror so positioned rearwardly of the aperture as to reflect light beams entering through the aperture on to and through the portion of the ribbon loop adjacent the sensitized element.

JOSEPH ANTHONY.